(12) United States Patent
Lin

(10) Patent No.: US 12,047,111 B2
(45) Date of Patent: Jul. 23, 2024

(54) TRANSMIT-RECEIVE SWITCH WITH HARMONIC DISTORTION REJECTION AND ELECTROSTATIC DISCHARGE PROTECTION

(71) Applicant: Apple Inc., Cupertino, CA (US)

(72) Inventor: Saihua Lin, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 48 days.

(21) Appl. No.: 17/859,860

(22) Filed: Jul. 7, 2022

(65) Prior Publication Data

US 2022/0376735 A1    Nov. 24, 2022

Related U.S. Application Data

(63) Continuation of application No. 17/328,783, filed on May 24, 2021, now Pat. No. 11,411,596.

(51) Int. Cl.
*H04B 1/44* (2006.01)
*H04B 1/00* (2006.01)
(Continued)

(52) U.S. Cl.
CPC .............. *H04B 1/48* (2013.01); *H04B 1/006* (2013.01); *H04B 1/0064* (2013.01); *H04B 2001/485* (2013.01)

(58) Field of Classification Search
CPC ... H04B 1/38; H04B 1/40; H04B 1/44; H04B 1/48; H04B 1/54; H04B 1/58;
(Continued)

(56) References Cited

U.S. PATENT DOCUMENTS

| 5,697,069 A | 12/1997 | Boehm et al. | |
|---|---|---|---|
| 6,236,274 B1 * | 5/2001 | Liu | H03F 3/72 330/306 |

(Continued)

FOREIGN PATENT DOCUMENTS

| CN | 1484892 A | 3/2004 |
|---|---|---|
| CN | 102396152 A | 3/2012 |

(Continued)

OTHER PUBLICATIONS

Extended European Search Report for European Patent Application No. 22168166.1 dated Oct. 5, 2022; 10 pgs.

(Continued)

*Primary Examiner* — Quochien B Vuong
(74) *Attorney, Agent, or Firm* — FLETCHER YODER PC

(57) ABSTRACT

Embodiments disclosed herein relate to reducing insertion loss in a transceiver while improving an operating efficiency of the transceiver. To do so, the transceiver may include isolation circuitry with harmonic distortion rejection circuitry, an electrostatic discharge filter, an out-of-band noise filter, and/or a matching network. In particular, the harmonic distortion rejection circuitry may enable a second harmonic signal to pass from a power amplifier of a transmitter of the transceiver to ground. The electrostatic discharge filter may also provide a path to ground for electrostatic discharge, and the out-of-band noise filter may provide a path to ground for noise signals. The isolation circuitry may substantially remove or decrease interference caused by undesirable signals while reducing a power consumption and thus improving an operating efficiency of the transceiver.

20 Claims, 7 Drawing Sheets

(51) Int. Cl.
*H04B 1/48* (2006.01)
*H04B 1/525* (2015.01)

(58) Field of Classification Search
CPC ........ H04B 1/581; H04B 1/582; H04B 1/586; H04B 1/525; H04B 1/006; H04B 1/0064; H04B 2001/458
See application file for complete search history.

(56) References Cited

U.S. PATENT DOCUMENTS

| | | | |
|---|---|---|---|
| 6,870,442 B1 | 3/2005 | Suzuki et al. | |
| 7,460,612 B2 | 12/2008 | Eliezer et al. | |
| 7,711,389 B2 * | 5/2010 | Furutani | H04B 1/0057 455/78 |
| 7,756,486 B1 | 7/2010 | Tan et al. | |
| 8,576,005 B2 | 11/2013 | Liao | |
| 9,100,060 B2 * | 8/2015 | Ilkov | H04B 1/006 |
| 9,203,451 B2 | 12/2015 | Kehrer et al. | |
| 9,621,337 B2 | 4/2017 | Hao et al. | |
| 9,866,196 B2 * | 1/2018 | Gorbachov | H03F 1/565 |
| 9,979,375 B2 | 5/2018 | Leuschner et al. | |
| 10,305,432 B1 | 5/2019 | Trayling et al. | |
| 10,305,533 B2 * | 5/2019 | Mizokami | H04B 1/48 |
| 10,476,533 B1 | 11/2019 | Chi et al. | |
| 10,511,344 B1 | 12/2019 | Korol et al. | |
| 11,158,936 B2 | 10/2021 | Pathasarathy | |
| 11,196,298 B2 | 12/2021 | Mantha et al. | |
| 2004/0266378 A1 | 12/2004 | Fukamachi et al. | |
| 2010/0259319 A1 | 10/2010 | Chan et al. | |
| 2013/0331043 A1 | 12/2013 | Perumana et al. | |
| 2016/0072455 A1 | 3/2016 | Lin | |
| 2017/0019135 A1 | 1/2017 | Kwok et al. | |
| 2017/0244442 A1 | 8/2017 | Mizokami et al. | |
| 2019/0317258 A1 | 10/2019 | Zheng et al. | |
| 2019/0334560 A1 | 10/2019 | Chi et al. | |
| 2019/0341961 A1 | 11/2019 | Khatib et al. | |
| 2020/0091608 A1 | 3/2020 | Alpman et al. | |
| 2020/0235571 A1 | 7/2020 | Concannon et al. | |

FOREIGN PATENT DOCUMENTS

| | | |
|---|---|---|
| CN | 103166656 A | 6/2013 |
| CN | 106575975 A | 4/2017 |
| CN | 106797202 A | 5/2017 |
| CN | 108292928 A | 7/2018 |
| CN | 110336385 A | 10/2019 |
| CN | 110375849 A | 10/2019 |
| CN | 112204890 A | 1/2021 |
| JP | 2018074303 A | 5/2018 |
| WO | 0074233 A1 | 12/2000 |
| WO | 2021239226 A1 | 12/2021 |

OTHER PUBLICATIONS

Tan Qixin, "Design and Implementation of 2.45GHz RFID Analog RF Receiver Front-end"; China Excellence Master's Theses Full-text Database Information Technology Edition (Monthly), No. 7, 2020 (released Jul. 15, 2020).

J. H. Chun et al.; "Analysis and Measurement of Signal Distortion due to ESD Protection Circuits"; IEEE Journal of Solid-State Circuits, vol. 41, No. 10 (Sep. 18, 2006).

Office Action for Japanese Patent Application No. 2022105530808 dated Aug. 1, 2023; 8 pgs.

Notice to Grant and Search Report for Chinese Patent Application No. 202210553080.8 dated Jan. 4, 2024; 4 pgs.

* cited by examiner

TRANSMIT-RECEIVE SWITCH WITH HARMONIC DISTORTION REJECTION AND ELECTROSTATIC DISCHARGE PROTECTION

CROSS-REFERENCE TO RELATED APPLICATIONS

This application is a continuation of U.S. application Ser. No. 17/328,783, filed May 24, 2021, entitled "TRANSMIT-RECEIVE SWITCH WITH HARMONIC DISTORTION REJECTION AND ELECTROSTATIC DISCHARGE PROTECTION," the disclosure of which is incorporated by reference in its entirety for all purposes.

BACKGROUND

The present disclosure relates generally to wireless communication, and more specifically, to isolating wireless signals between transmitters and receivers in wireless communication devices.

In an electronic device, a transmitter and a receiver may each be coupled to one or more antennas to transmit and receive wireless signals. The electronic device may include isolation circuitry that isolates the transmitter from received signals (e.g., of a first frequency range) and isolated the receiver from transmission signals (e.g., of a second frequency range). In this manner, interference between the transmission and received signals may be reduced when communicating using the electronic device. However, these communications may be negatively impacted by insertion (e.g., signal) loss resulting from components of the isolation circuitry providing less than ideal isolation of the transmission and received signals. Further, second harmonic distortion of the transmission signal may interfere with the transmission signal and negatively impact operation of the electronic device. Moreover, electrostatic discharge in the isolation circuitry may interfere with the transmission and received signals and/or decrease a lifespan of components of the electronic device, including the transmitter and the receiver.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an electronic device is provided that includes one or more antennas, transmit circuitry coupled to the one or more antennas, and receive circuitry coupled to the one or more antennas. The electronic device also includes isolation circuitry coupled to the one or more antennas, the transmit circuitry, and the receive circuitry. The isolation circuitry includes a transmission switch and a balun. The balun includes a first coil coupled to the transmit circuitry and a second coil coupled to the transmission switch and ground. The isolation circuitry also includes an inductor coupled in parallel with the transmission switch. A capacitor is coupled to the inductor In another embodiment, isolation circuitry of a transceiver is provided. The isolation circuitry includes a transmit-receive switch coupled to one or more antennas. The isolation circuitry also includes an inductor pair includes a first inductor and a second inductor coupled in series. The inductor pair is coupled in parallel to the transmit-receive switch. A capacitor is coupled to the first inductor, the second inductor, and ground.

In yet another embodiment, a user equipment is provided that includes one or more antennas. The user equipment also includes transmit circuitry and receive circuitry communicatively coupled to the one or more antennas. Isolation circuitry is disposed between and communicatively coupled to the transmit circuitry and the receive circuitry. The isolation circuitry includes harmonic distortion rejection circuitry, electrostatic discharge filtering circuitry, and noise filtering circuitry. The harmonic distortion rejection circuitry is configured to decrease harmonic distortion generated by the transmit circuitry. The electrostatic discharge filtering circuitry is configured to decrease electrostatic discharge of the user equipment. The noise filtering circuitry is configured to decrease noise of the isolation circuitry.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
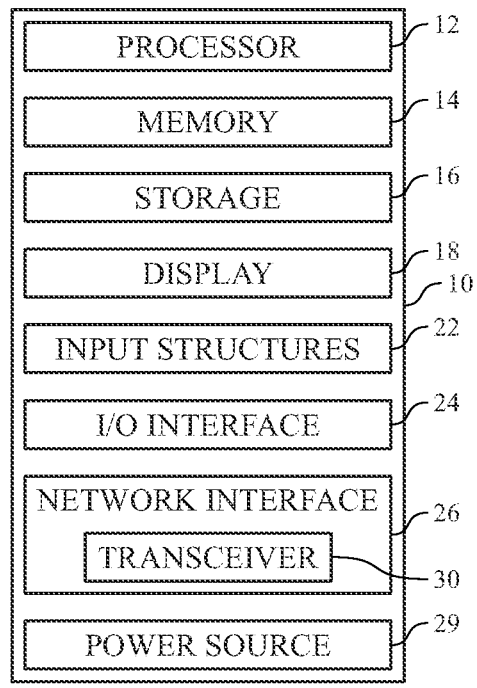
FIG. 1 is a block diagram of an electronic device, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the term "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

This disclosure is directed to reducing insertion loss caused by isolation circuitry while maintaining isolation of a transmitter and a receiver of an electronic device by reducing interference of transmission and received signals. For example, the isolation circuitry may include one or more transmit-receive switches that enable the transmitter to transmit a signal (e.g., a transmission signal) via one or more antennas of the electronic device in a first state, and enable the receiver to receive a signal (e.g., a received signal) via the one or more antennas in a second state. However, the one or more transmit-receive switches may cause signal or power loss (referred to as insertion loss) of the transmission (and/or received) signal due to components of the isolation circuitry providing less than ideal isolation. Further, a power amplifier of the transmitter may generate a second harmonic distortion signal that negatively impacts the transmission signal to be output by the antenna. Electrostatic discharge and out-of-band noise in the electronic device may also negatively impact the transmission and received signals and interfere with wireless communications of the electronic device.

To reduce interference and/or distortion of the transmission and received signals, the isolation circuitry may include harmonic distortion rejection circuitry, electrostatic discharge filter circuitry, out-of-band noise filter circuitry, and a matching network. The harmonic distortion rejection circuitry, electrostatic discharge filter circuitry, out-of-band noise filter circuitry, and matching network may have separate circuit components (e.g., capacitors, inductors, etc.) or may share one or more circuit components. For example, a first signal path within the isolation circuitry may reject second harmonic distortion by enabling a second harmonic signal to pass from the power amplifier to ground. A second signal path may enable electrostatic discharge and/or out-of-band noise to propagate to ground and may include at least a portion of the first signal path.

Advantageously, embodiments presented herein provide various apparatuses and techniques to reduce insertion loss and reduce interference caused by noise including harmonic distortion, electrostatic discharge, out-of-band noise, and the like. Further, reducing interference of the transmission and received signals provides reduced power consumption and improved operating efficiency. Moreover, providing an electrostatic discharge path may improve the lifespan of components of the electronic device, including the transmitter and the receiver.

FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may perform the various functions described herein and below.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as a BLUETOOTH® network, for a local area network (LAN) or wireless local area network (WLAN), such as a network employing one of the IEEE 802.11x family of protocols (e.g., WI-FI®), and/or for a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a satellite network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)). The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas. Thus, the transceiver may include a transmitter and a receiver. In some embodiments, the transceiver 30 may include isolation circuitry. The isolation circuitry be disposed between the transmitter and receiver, and isolate the receiver from a transmission signal and isolate the transmitter from a received signal. Further, the isolation circuitry may provide one or more signal paths for signals (e.g., distortion and/or noise signals) that may interfere with the transmission and received signals, while decreasing or minimizing insertion loss caused by the isolation circuitry.

The power source 29 of the electronic device 10 may include any suitable source of power, such as a rechargeable lithium polymer (Li-poly) battery and/or an alternating current (AC) power converter. In certain embodiments, the electronic device 10 may take the form of a computer, a portable electronic device, a wearable electronic device, or other type of electronic device.

Figure 2:
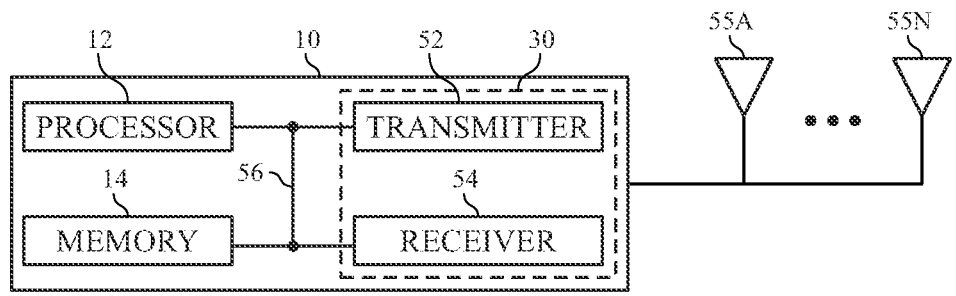
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and an external device via, for example, a network (e.g., including base stations) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards.

The transmitter 52 may wirelessly transmit packets having different packet types or functions. For example, the transmitter 52 may transmit packets of different types generated by the processor 12. The receiver 54 may wirelessly receive packets having different packet types. In some examples, the receiver 54 may detect a type of a packet used and process the packet accordingly. In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figure 3:
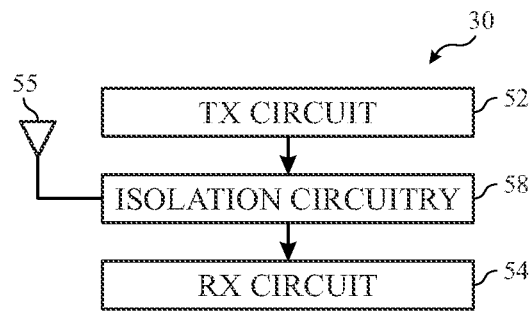
FIG. 3 is a block diagram of a transceiver of the electronic device of FIG. 1, according to embodiments of the present disclosure.

FIG. 3 is a block diagram of the transceiver 30 (e.g., transceiver circuitry) of the electronic device 10, according to embodiments of the present disclosure. As illustrated, the transceiver 30 includes a transmitter 52 (e.g., a transmit circuit) and a receiver 54 (e.g., a receive circuit) that are coupled to at least one antenna to enable the electronic device 10 to transmit and receive wireless signals. The transceiver circuitry 30 includes isolation circuitry 58 disposed between and communicatively coupled to the transmitter 52 and the receiver 54. The isolation circuitry 58 isolates the transmitter 52 from received signals, and the receiver 54 from transmission signals, thus reducing interference when communicating. In some embodiments, the isolation circuitry 58 is coupled to one or more antennas 55. In some alternative embodiments, the one or more antennas 55 may be disposed within the isolation circuitry 58.

The isolation circuitry 58 enables signals (e.g., transmission signals) of a first frequency range from the transmitter 52 to pass through to the one or more antennas 55 and blocks the signals of the first frequency range from passing through to the receiver 54. The isolation circuitry 58 also enables signals (e.g., received signals) of a second frequency range received via the one or more antennas 55 to pass through to the receiver 54 and blocks the received signals of the second frequency range from passing through to the transmitter 52. Each frequency range may be of any suitable bandwidth, such as between 0 and 100 gigahertz (GHz) (e.g., 10 megahertz (MHz)), and include any suitable frequencies. For example, the first frequency range (e.g., a transmit frequency range) may be between 20 and 40 GHz, and the second frequency range (e.g., a receive frequency range) may be between 50 and 80 GHz.

In some embodiments, the isolation circuitry 58 isolates a target signal (e.g., the transmit or receive signals) from an associated signal that may interfere with the target signal. For example, when transmitting a transmission signal, a power amplifier (not shown in FIG. 3) of the transmitter 52 may generate harmonic distortion of the transmission signal which propagates with the transmission signal toward the antenna 55. The harmonic distortion may interfere with (e.g., distort) the transmission signal and negatively impact operation of the transceiver 30. Thus, the isolation circuitry 58 may filter the harmonic distortion from the target transmission signal by enabling a second harmonic signal to pass from the power amplifier to ground to improve wireless communication of the transceiver 30.

The isolation circuitry 58 may also filter out noise signals generated by the transmitter 52, the receiver 54, or other component of the electronic device 10. For example, static electricity may be generated by a component of the electronic device 10. Electrostatic discharge is a sudden flow of the static electricity due to, for example, a breakdown of dielectric material. The electrostatic discharge may interfere with the target signals and/or decrease a lifespan of components of the electronic device 10, such as the transmitter 52 and receiver 54. Noise signals, such as out-of-band-noise, may also interfere with the target signals. To prevent such interference and/or improve a lifespan of components of the electronic device 10, the isolation circuitry 58 may filter the electrostatic discharge and noise signals by providing a path to ground for such signals.

Further, the isolation circuitry 58 may isolate the receiver 54 from the transmit signal and isolate the transmitter 52 from the receive signal. For example, some of the transmit signal (e.g., a transmission leakage signal) may propagate toward the receiver 54 and interfere with the receiver 54. To prevent such interference, the isolation circuitry 58 may isolate the receiver 54 from the transmit signal and/or the transmission leakage signal. Similarly, some of the receive signal (e.g., a receive leakage signal) may propagate to and interfere with or decrease a lifespan of the transmitter 52. To prevent such interference, the isolation circuitry 58 may isolate the transmitter 52 from the receive leakage signal by providing a path to ground for such signal.

Embodiments herein provide various apparatuses and techniques to reduce or substantially prevent interference and/or distortion of transmit and receive signals by maintaining isolation of the transmitter 52 and the receiver 54 of the electronic device 10. To do so, the embodiments disclosed herein include isolation circuitry that may have one or more transmit-receive switches and filter circuitry that provides a path to ground for noise and/or distortion signals. Further, embodiments disclosed herein may provide a path to ground for electrostatic discharge within the electronic device 10, and thereby may improve a lifespan of the electronic device, including the transmitter 52 and the receiver 54.

Figure 4:
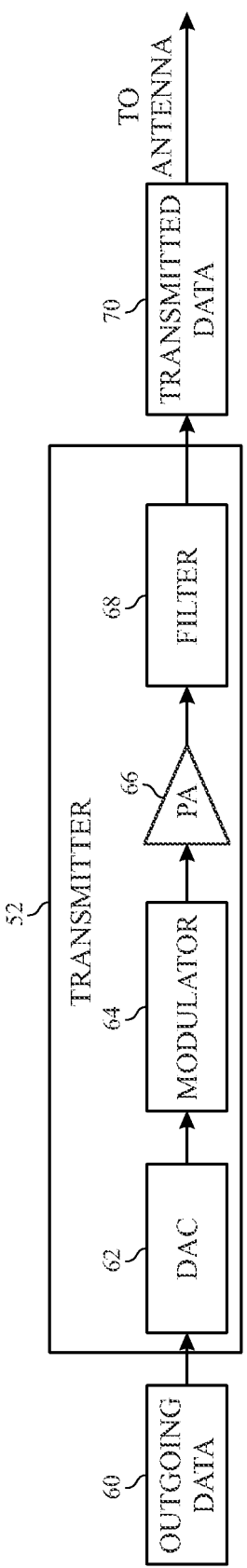
FIG. 4 is a schematic diagram of a transmitter of the electronic device of FIG. 1, according to embodiments of the present disclosure.

FIG. 4 is a schematic diagram of the transmitter 52 (e.g., transmit circuitry), according to embodiments of the present disclosure. As illustrated, the transmitter 52 may receive outgoing data 60 in the form of a digital signal to be transmitted via the one or more antennas 55. A digital-to-analog converter (DAC) 62 of the transmitter 52 may convert the digital signal to an analog signal, and a modulator 64 may combine the converted analog signal with a carrier signal to generate a radio wave. A power amplifier (PA) 66 receives the modulated signal from the modulator 64. The power amplifier 66 may amplify the modulated signal to a suitable level to drive transmission of the signal via the one or more antennas 55. A filter 68 (e.g., filter circuitry and/or software) of the transmitter 52 may then substantially remove or reduce an impact of undesirable noise from the amplified signal to generate transmitted data 70 to be transmitted via the one or more antennas 55. The filter 68 may include any suitable filter or filters to substantially remove the undesirable noise from the amplified signal, such as a bandpass filter, a bandstop filter, a low pass filter, a high pass filter, and/or a decimation filter. Additionally, the transmitter 52 may include any suitable additional components not shown, or may not include certain of the illustrated components, such that the transmitter 52 may transmit the outgoing data 60 via the one or more antennas 55. For example, the transmitter 52 may include a mixer and/or a digital up converter. As another example, the transmitter 52 may not include the filter 68 if the power amplifier 66 outputs the amplified signal in or approximately in a desired frequency range (such that filtering of the amplified signal may be unnecessary).

Figure 5:
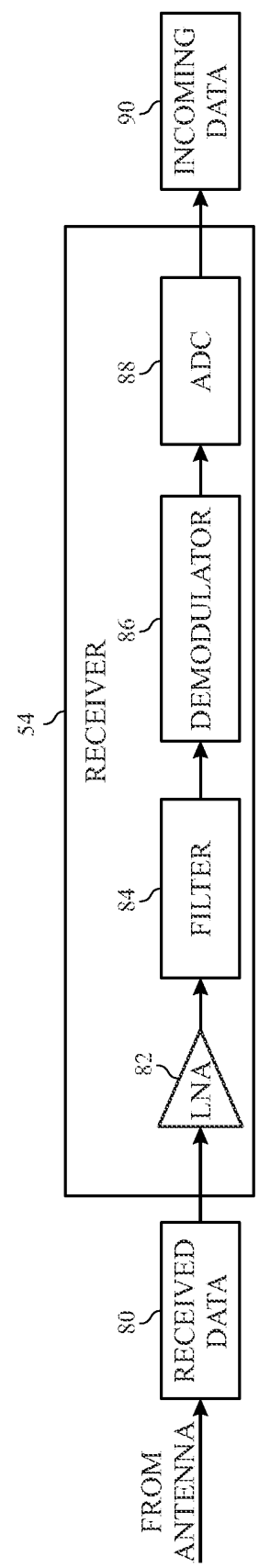
FIG. 5 is a schematic diagram of a receiver of the electronic device of FIG. 1, according to embodiments of the present disclosure.

FIG. 5 is a schematic diagram of the receiver 54 (e.g., receive circuitry), according to embodiments of the present disclosure. As illustrated, the receiver 54 may receive received data 80 from the one or more antennas 55 in the form of an analog signal. A low noise amplifier (LNA) 82 may amplify the received analog signal to a suitable level for the receiver 54 to process. A filter 84 (e.g., filter circuitry and/or software) may remove undesired noise from the received signal, such as cross-channel interference. The filter 84 may also remove additional signals received by the one or more antennas 55 that are at frequencies other than the desired signal. The filter 84 may include any suitable filter or filters to remove the undesired noise or signals from the received signal, such as a bandpass filter, a bandstop filter, a low pass filter, a high pass filter, and/or a decimation filter. A demodulator 86 may remove a radio frequency envelope and/or extract a demodulated signal from the filtered signal for processing. An analog-to-digital converter (ADC) 88 may receive the demodulated analog signal and convert the signal to a digital signal of incoming data 90 to be further processed by the electronic device 10. Additionally, the receiver 54 may include any suitable additional components not shown, or may not include certain of the illustrated components, such that the receiver 54 may receive the received data 80 via the one or more antennas 55. For example, the receiver 54 may include a mixer and/or a digital down converter.

Figure 6:
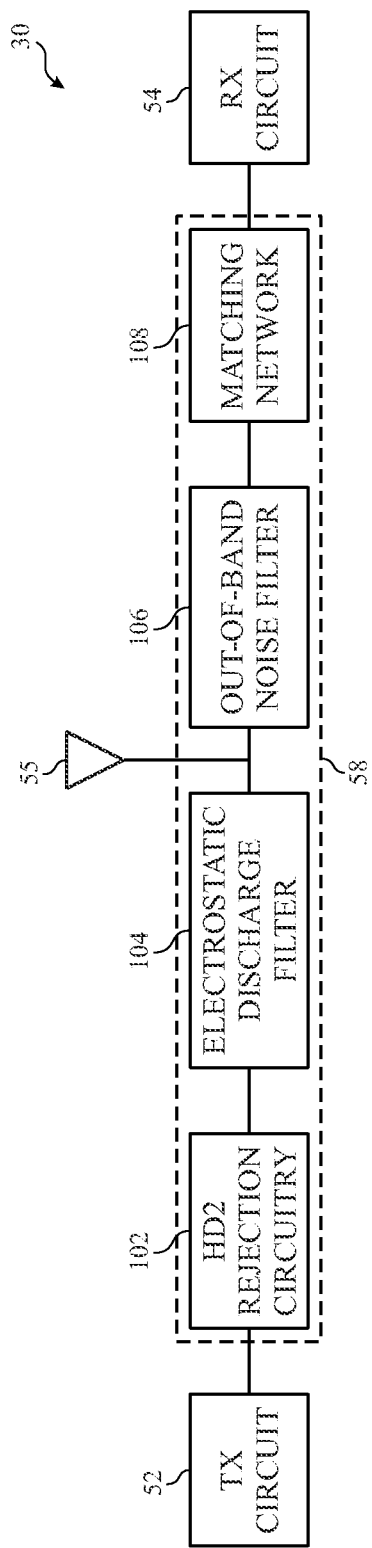
FIG. 6 is a block diagram of the transceiver of FIG. 3 illustrating isolation circuitry components, according to embodiments of the present disclosure.

FIG. 6 is a block diagram of the transceiver 30 of FIG. 3 including the isolation circuitry 58 of FIG. 3, according to embodiments of the present disclosure. As discussed above, the isolation circuitry 58 may isolate the receiver 54 from a transmission signal and the transmitter 52 from a receive signal. The isolation circuitry 58 may also filter and/or reject noise and other signals that may interfere with or degrade wireless communication of the electronic device 10. To do so, the isolation circuitry 58 may include various components (e.g., circuitry) such as harmonic rejection circuitry 102, an electrostatic discharge filter 104, an out-of-band noise filter 106, and a matching network 108. Each component of the isolation circuitry 58 may include various electrical or circuit elements (e.g., inductors, capacitors, etc.) that make up ground paths for the respective signals.

As shown, the harmonic (e.g., second order harmonic or "HD2") rejection circuitry 102 is disposed between the transmitter 52 and the one or more antennas 55. The harmonic rejection circuitry 102 provides a path to ground for harmonic distortion generated by the transmitter (or any other component of the electronic device 10). For example, the power amplifier 66 of the transmit circuit 52 may generate second order harmonic distortion in the transmit signal. The harmonic rejection circuitry 102 may substantially remove the harmonic distortion from a target signal (e.g., a transmit and/or receive signal) in the transceiver 30 via the path to ground to substantially reduce or prevent interference with and/or distortion of the target signal. By reducing interference with the target signal, the harmonic rejection circuitry 102 may improve an operating efficiency of the transceiver 30.

The electrostatic discharge filter 104 is disposed between the harmonic distortion rejection circuitry and the one or more antennas 55. The electrostatic discharge filter 104 may provide a ground path for electrostatic discharge that occurs within the electronic device 10 and enters into the transceiver 30. That is, the electrostatic discharge filter 104 may substantially remove electrical current caused by electrostatic discharge from the electronic device 10 via the ground path within the electronic device 10. Thus, the electrostatic discharge filter 104 may substantially reduce an occurrence of interference or distortion caused by the electrostatic discharge and prevent or substantially reduce an occurrence of the electrostatic discharge from decreasing a lifespan of the transmitter 52 and/or receiver 54. Accordingly, the electrostatic discharge filter 104 may improve an operating efficiency and/or a lifespan of the transceiver 30.

In some embodiments, the isolation circuitry 58 may include more than one electrostatic discharge filter 104. For example, a first electrostatic discharge filter 104 may be disposed between the transmitter 52 and the one or more antennas 55 and a second electrostatic discharge filter 104 may be disposed between the receiver 54 and the one or more antennas 55. In that case, the first electrostatic discharge filter 104 may provide a ground path for electrostatic discharge when the transceiver is in a transmit mode (e.g., a first mode, when the transmitter 52 is active) and the second electrostatic discharge filter 104 may provide a ground path for electrostatic discharge when the transceiver is in a receive mode (e.g., a second mode, when the receiver 54 is active).

The out-of-band noise filter 106 may provide a ground path for electrical noise within the transceiver 30. That is, the out-of-band noise filter 106 may filter our noise signals within the transceiver 30, thus, substantially reducing an occurrence of interference caused by such signals. In some embodiments, the isolation circuitry 58 may include more than one out-of-band noise filter 106. For example, a first out-of-band noise filter 106 may be disposed between the transmitter 52 and the one or more antennas 55 and a second out-of-band noise filter 106 may be disposed between the receiver 54 and the one or more antennas 55. In that case, the first out-of-band noise filter 106 may provide a ground path for noise signals when the transceiver is in the transmit mode (e.g., when the transmitter 52 is active) and the second out-of-band noise filter 106 may provide a ground path for noise signals when the transceiver is in the receive mode (e.g., when the receiver 54 is active). The matching network 108 may balance an impedance of the one or more antennas 55 and the transmitter 52 and/or receiver 54. That is, the matching network 108 may be an impedance matching network. In some embodiments, all or a portion of the matching network 108 may be included in the transmitter 52 and/or the receiver 54.

As discussed in more detail below with respect to FIG. 7 below, various circuit elements (e.g., inductors, capacitors, etc.) of the isolation circuitry 58 may be shared between the components thereof. In additional or alternative embodiments, each component of the isolation circuitry 58 may have separate circuit elements. It should be understood that the components of the isolation circuitry 58 may be configured in arrangements other than shown in FIG. 6. For example, the harmonic distortion rejection circuitry 102 may be disposed between the electrostatic discharge filter 104.

Figure 7:
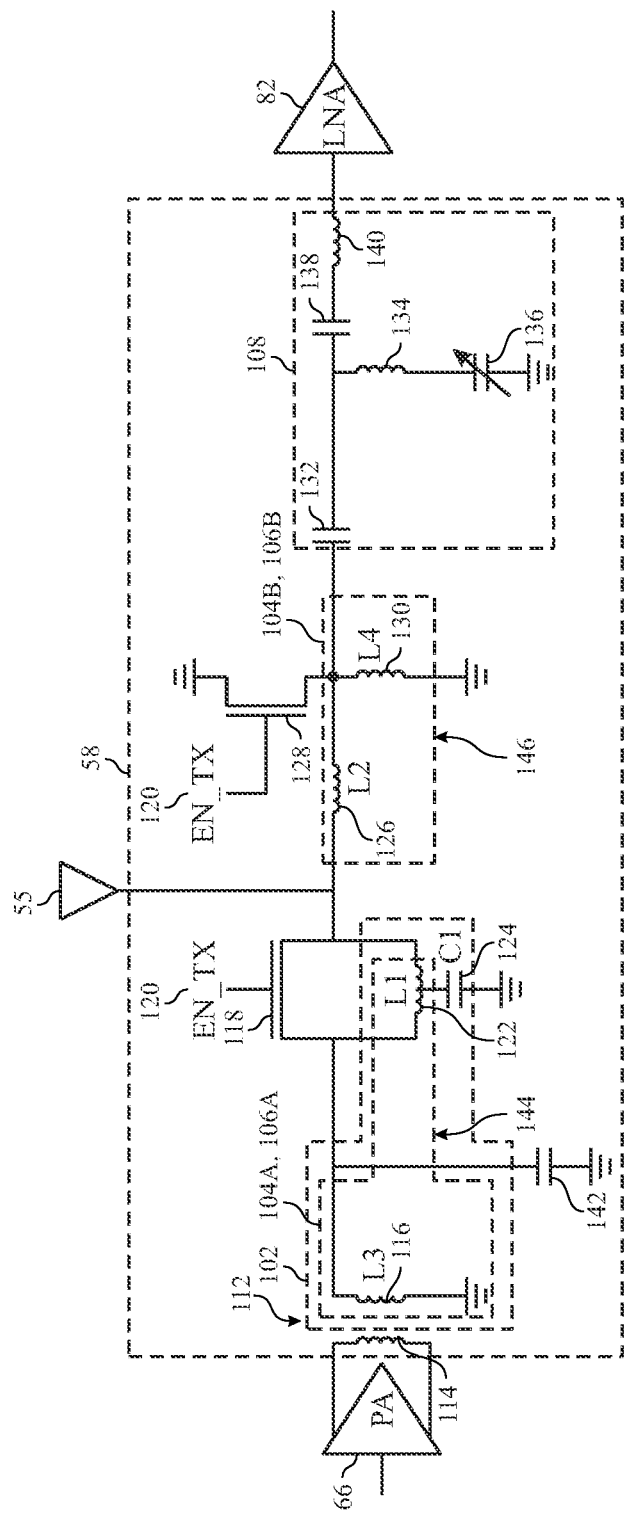
FIG. 7 is a schematic diagram of the isolation circuitry of FIG. 6, according to embodiments of the present disclosure.

FIG. 7 is a schematic diagram of the isolation circuitry 58 of FIG. 6, according to embodiments of the present disclosure. As shown, FIG. 7 illustrates components of the harmonic rejection circuitry 102, the electrostatic discharge filter 104, the out-of-band noise filter 106, and the matching network 108, discussed with respect to FIG. 6. The power amplifier 66 may be part and/or representative of the transmitter 52 and the low noise amplifier 82 may be part and/or representative of the receiver 54. In some embodiments, an operating frequency of the power amplifier 66 may be between 15 GHz and 50 GHz, such as about 28 GHz.

The isolation circuitry 58 includes a balun transformer 112 disposed between the power amplifier 66 of the transmitter 52 and the harmonic rejection circuitry 102. The balun 112 may include a set of coils, such as two coils as illustrated. In operation, the coils may function as an inductor. The power amplifier 66 may be coupled to a first coil 114 of the balun 112. In some embodiments, the power amplifier 66 may be directly coupled to the first coil 114 of the balun 112 without an intermediate component coupled between. The harmonic rejection circuitry 102 may include a second coil 116 of the balun 112 that may be coupled to the first coil 114 via the transformer effect. The second coil 116 may be directly coupled to ground and may function as an inductor ("L3") from the perspective of a signal received by the one or more antennas 55 or from a direction of the low noise amplifier 82 of the receiver 54. That is, one terminal of the second coil 116 may be coupled to ground without another component between.

The harmonic rejection circuitry 102 may also include a transmit-receive switch 118 that enables a transmit signal to propagate from the power amplifier 66 to the one or more antennas 55 for transmission. The transmit-receive switch 118 may include a transistor and be activated or deactivated (e.g., closed or open) based on a mode of the transceiver 30 (e.g., as indicated by the processor 12). For example, the transmit-receive switch 118 may activate (e.g., close) upon receiving a logic high (e.g., 1) transmission enable signal 120 (e.g., from the processor 12) if the transceiver 30 is in a transmit mode. That is, if the transceiver 30 is in the transmit mode, the processor 12 may send the logic high transmission enable signal 120 to the transmit-receive switch 118 to close the transmit-receive switch 118 and enable the transmit signal to propagate therethrough. If the transceiver 30 is in a mode other than the transmit mode (e.g., the receive mode, a standby mode, or off), the processor 12 may send a logic low (e.g., 0) transmission enable signal 120 to the transmit-receive switch 118 to cause the transmit-receive switch 118 to open, preventing a signal to propagate therethrough.

The harmonic rejection circuitry 102 may include an inductor 122 ("L1") disposed between the balun 112 and the one or more antennas 55. The inductor 122 is disposed in parallel with the transmit-receive switch 118. That is, the inductor 122 may provide an alternative signal path from the balun 112 to the one or more antennas 55. The inductor 122 may be configured to provide a first impedance state (e.g., a lower impedance) for signals having frequencies within a first frequency range, and a second impedance state (e.g., a higher impedance) for signals having frequencies within a second frequency range. For example, the first impedance state may approach or appear as a short or closed circuit (e.g., approaching or approximately equal to zero Ohms, such as between 0 and 100 Ohms, 0.1 and 10 Ohms, 0.5 and 2 Ohms, and so on), while the second impedance state may approach or appear as an open circuit (e.g., providing an impedance greater than the first impedance state, such as greater than 10000 Ohms, greater than 1000 Ohms, greater than 100 Ohms, greater than 10 Ohms, greater than 5 Ohms, and so on). In some embodiments, the inductor 122 may have a high impedance for a signal having a relatively high frequency (e.g., between 15 and 100 GHz) and a low impedance for a signal having a relatively low frequency (e.g., between 2 and 12 GHz). Thus, the inductor 122 may enable a noise signal having a low frequency to pass therethrough (e.g., to ground) while substantially blocking the transmit signal and the receive signal having a relatively high frequency. The inductor 122 may substantially prevent the transmit signal from propagating therethrough due to the high impedance at a relatively high frequency. In this manner, the harmonic rejection circuitry 102 may reduce or substantially eliminate noise signals without negatively impacting desired signals (e.g., transmission and received signals).

The harmonic rejection circuitry 102 includes a capacitor 124 that is coupled to the inductor 122 and ground. In some embodiments, the capacitor 124 may tap into the windings of the inductor 122. That is, a connection point of the capacitor 124 to the inductor 122 may be adjustable such that the connection point is closer to or farther from the power amplifier 66. Moving the connection point of the capacitor 124 may change an impedance of a portion of the inductor 122 on either side of the connection point. For example, as the connection point of the capacitor 124 moves toward the power amplifier 66, a size of the portion of the inductor 122 between the power amplifier 66 and the connection point decreases, resulting in a decreased impedance of that portion. Similarly, as the connection point is moved away from the power amplifier 66, a size of the portion of the inductor 122 between the power amplifier 66 and the connection point increases, resulting in an increased impedance of that portion. In some embodiments, the connection point may be at a midpoint between opposite ends of the inductor 122. In this way, changing the connection point of the capacitor 124 to the inductor 122 changes the impedance of the inductor 122, thus adjusting a frequency range of signals enabled to pass through the inductor 122 and the capacitor 124 to ground.

In operation, the harmonic rejection circuitry 102 may provide a path to ground through the second coil 116 of the balun 112, the inductor 122 (e.g., at least a portion of the inductor 122), and the capacitor 124 for signals having frequencies within a targeted frequency range as dictated by the connection point of the capacitor 124 to the inductor 122. In particular, the connection point of the capacitor 124 to the inductor 122 may be chosen to enable passthrough of signals having frequencies corresponding to the second order harmonic (e.g., between 30 GHz and 200 GHz). In this way, the harmonic rejection circuitry 102 may substantially remove harmonic distortion generated by the power amplifier 66 from the transceiver 30 to substantially prevent interference with the transmit signal.

As illustrated, the isolation circuitry 58 may include a number of electrostatic discharge filters 104 and out-of-band noise filters 106. For example, a first filter 144 may be disposed between and/or communicatively coupled to the power amplifier 66 and the one or more antennas 55 and may include a first electrostatic discharge filter 104A and a first out-of-band noise filter 106A. A second filter 146 may be disposed between and/or communicatively coupled to the one or more antennas 55 and the low noise amplifier 82 and may include a second electrostatic discharge filter 104B and a second out-of-band noise filter 106B. As shown, the first filter 144 includes the inductor 122 and the second coil 116 of the balun 112. The second filter 146 includes an inductor 126 disposed between and communicatively coupled to the one or more antennas 55 and the low noise amplifier 82. The second filter also includes an inductor 130 disposed between and communicatively coupled to the inductor 126 and ground.

While the first filter 144 and the second filter 146 are shown as physically separate and having different circuit elements, it should be understood that the isolation circuitry may have a single filter (e.g., combining the filters 144, 146) and thus a single electrostatic discharge filter 104 and/or a single out-of-band noise filter 106. In operation, the filters 144, 146 may decrease and/or substantially remove electrostatic discharge current and/or noise signals from the transceiver 30 via one or more connections to ground. That is, even though the first and second electrostatic discharge filters 104 are separate, they may perform the same or similar functions of decreasing and/or removing electrostatic discharge current and/or noise from the transceiver 30.

The first filter 144 may provide a path to ground via the inductor 122 and the second coil 116 of the balun 112 for electrostatic discharge and/or noise signals within the transceiver 30, thus protecting the transmitter 52 and/or receiver 54 from electrostatic discharge and/or interference. Similarly, the second filter 146 may provide a path to ground via the inductor 126 and the inductor 130 for electrostatic discharge and/or noise signal within the transceiver 30, thus protecting the transmitter 52 and/or receiver 54 from electrostatic discharge and/or interference.

The isolation circuitry 58 may include a transmit-receive switch 128 disposed between the one or more antennas 55 and the receiver 54. The transmit-receive switch 128 may receive the transmission enable signal 120 (e.g., from the processor 12) and thus close to create a shunt to ground when the transceiver 30 is in transmit mode. As shown, the matching network 108 is disposed between the receiver 54 and the one or more antennas 55. The matching network 108 may include a capacitor 132 disposed between the second filter 146 and the low noise amplifier 82 of the receiver 54. The capacitor 132 may substantially prevent signals having a relatively low frequency (e.g., a noise signal within a frequency range of 2 GHz and 20 GHz) from propagating to the low noise amplifier 82. The matching network 108 may also include a capacitor 138 disposed between and communicatively coupled to the capacitor 132 and the low noise amplifier 82. An inductor 134 and a capacitor 136 may be coupled in series and provide a ground path between the capacitor 132 and the capacitor 138. In some embodiments, the capacitor 136 may be a variable capacitor. An inductor 140 may be disposed between and communicatively coupled to the capacitor 138 and the low noise amplifier 82.

In some embodiments, the matching network 108 may function as a high pass filter to enable signals having a frequency higher than a threshold to pass through the matching network 108 to the low noise amplifier 82. In other embodiments, the matching network 108 may function as a low pass filter to enable signals having a frequency lower than a threshold to pass through the matching network 108 to the low noise amplifier 82. In some embodiments, the threshold frequency may be a range such as between 0 and 200 GHz, 25 and 30 GHz, 35 and 40 GHz, 45 and 50 GHz, and so on. In some embodiments, the threshold may be a particular frequency such as about 3.5 GHz, 4.1 GHz, 5 GHz, 7.125 GHz, 12 GHz, 25 GHz, and so on.

The isolation circuitry 58 may include additional circuit elements other than those shown in FIG. 7, such as capacitors and/or inductors. For example, a capacitor 142 may be communicatively coupled to ground and between the second coil 116 of the balun 112 and the transmit-receive switch 118. These circuit elements may provide additional ground paths for various signals (e.g., distortion and/or noise signals) to further reduce an occurrence of distortion of the target signals and/or improve a lifespan of components the transceiver 30.

Figure 8:
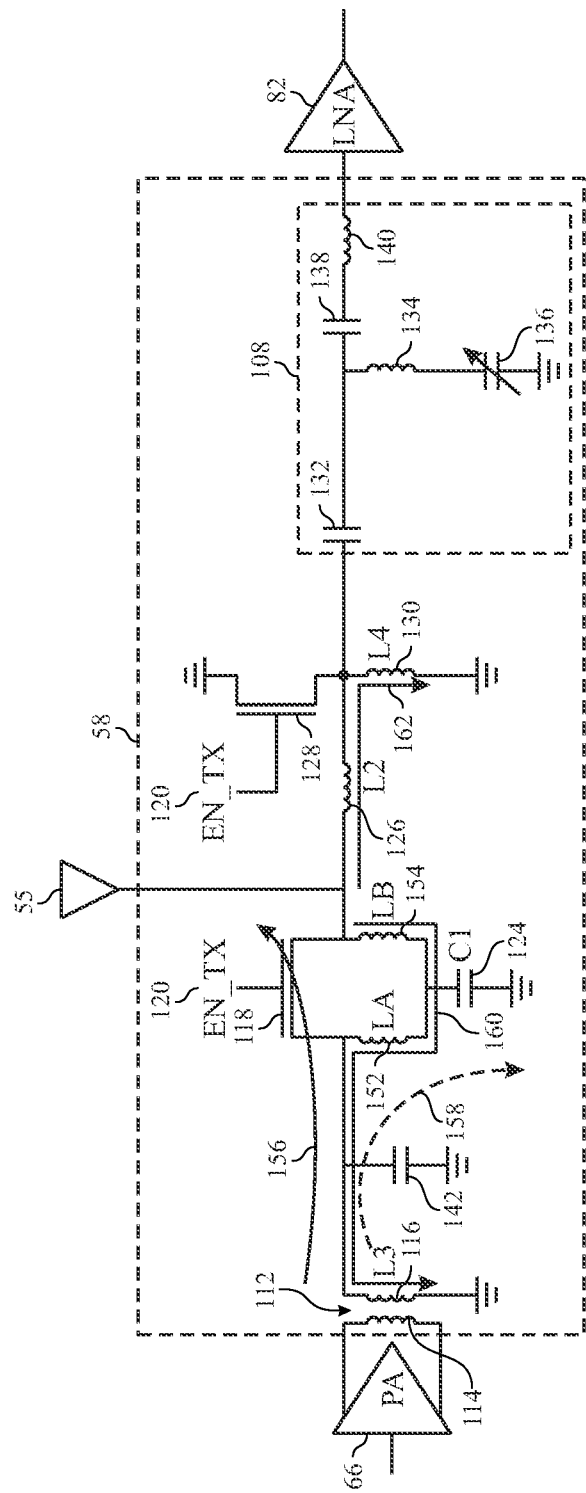
FIG. 8 is a schematic diagram of the isolation circuitry of FIG. 7 illustrating a path of a transmission (TX) signal, according to embodiments of the present disclosure.

FIG. 8 is a schematic diagram of the isolation circuitry 58 of FIG. 7 illustrating a path 156 of a transmission (TX) signal, according to embodiments of the present disclosure. The isolation circuitry 58 of FIG. 8 is substantially similar to the circuitry 58 of FIG. 7, with the addition of illustrated signal paths, and the inductor 122 of FIG. 7 illustrated as two inductors 152, 154. The inductors 152, 154 (e.g., an inductor pair) may represent the first portion and the second portion of the inductor 122 on either side of the connection of the capacitor 124. That is, the inductor 122 may be folded to form the inductors 152, 154. In some embodiments, the inductor 122 of FIG. 7 may be replaced by two separate inductors 152, 154. In that case, a combined inductance of the inductors 152, 154 may be equal to an inductance of the inductor 122 of FIG. 7.

The isolation circuitry 58 illustrates a path 156 of the transmission signal from the power amplifier 66 through the balun transformer 112 (via the transformer effect), through the transmit-receive switch 118 (that is closed due to, for example, the processor 12 sending a logic high transmission enable signal 120), and to the one or more antennas 55 for transmission. The high impedance of the inductor 152 for a relatively high frequency signal (e.g., between 25 GHz and 100 GHz) may prevent the transmission signal from propagating therethrough. Similarly, the high impedance of the inductor 126 of the second filter 146 for a relatively high frequency signal (e.g., between 2 GHz and 20 GHz) may prevent the transmission signal from propagating therethrough. In this way, at least the inductors 152 and 126 may direct the transmission signal to the one or more antennas 55.

As discussed above, the power amplifier 66 may generate a harmonic distortion signal that propagates along a path 158 from the power amplifier 66 through the inductor 152 (or a portion of the inductor 122 of FIG. 7) and the capacitor 124 to ground. That is, the inductor 152 and the capacitor 124 may act as or create a harmonic trap that pulls the harmonic distortion to ground, thus decreasing and/or rejecting the harmonic distortion signal. As discussed with respect to FIG. 7, the filters 144, 146 provide a path to ground for electrostatic discharge and noise signals within the isolation circuitry 58. For example, the first filter 144 may provide a path 160 through the inductors 154, 152 (or the inductor 122) and the second coil 116 of the balun 112 to ground. The second filter 146 may provide a path 162 through the inductor 126 and the inductor 130 to ground. In this way, the filters 144, 146 substantially remove electrostatic discharge and noise signals from the isolation circuitry 58 to substantially reduce an occurrence of interference with the transmit signal and/or increase or improve a lifespan of the components of the transceiver 30. In some cases, the closed transmit-receive switch 128 may provide a low impedance (e.g., zero impedance) path to ground for the electrostatic discharge and/or noise signals. Thus, the transmit-receive switch 128 may also decrease or substantially prevent interference of the electrostatic discharge and/or noise signals with the transmit signal, and/or increase or improve a lifespan of the components of the transceiver 30.

Figure 9:
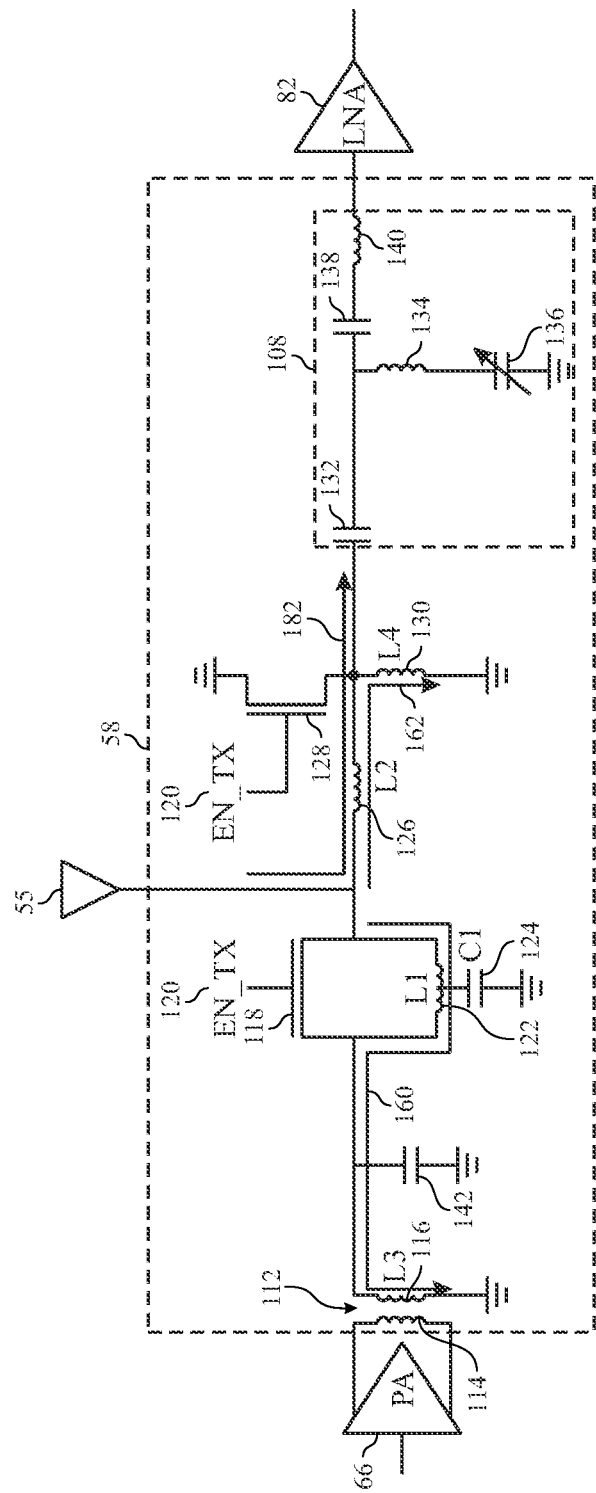
FIG. 9 is a schematic diagram of the isolation circuitry of FIG. 7 illustrating a path of a received (RX) signal, according to embodiments of the present disclosure.

FIG. 9 is a schematic diagram of the isolation circuitry 58 of FIG. 7 illustrating a path 182 of a received (RX) signal, according to embodiments of the present disclosure. The isolation circuitry 58 of FIG. 9 is substantially similar to the isolation circuitry 58 of FIG. 7, and illustrates a receive mode for receiving the received signal via the one or more antennas 55. That is, the processor 12 may send a logic low transmit enable signal 120, opening the transmit-receive switches 118, 128, and thus preventing the received signal, electrostatic discharge, and/or noise signals from propagating therethrough. As discussed above, electrostatic discharge and/or noise signals in the transceiver 30 may propagate along the paths 160, 162, thereby reducing occurrence of interference with the received signal and/or increasing or improving lifespan of the components of the transceiver 30.

The received signal propagates along the path 182 from the one or more antennas 55 to the low noise amplifier 82 of the receiver 54 via the inductor 126 and the matching network 108. The received signal propagates through the matching network 108 rather than the inductor 130 due to the relatively low impedance of the capacitor 132 compared to the impedance of the inductor 130 at the frequency of the received signal (e.g., between 25 GHZ and 50 GHz). Similarly, the received signal propagates through the matching network 108 rather than the inductor 122 due to the relatively low impedance of the capacitor 132 compared to the impedance of the inductor 122 at the frequency of the received signal.

Figure 10:
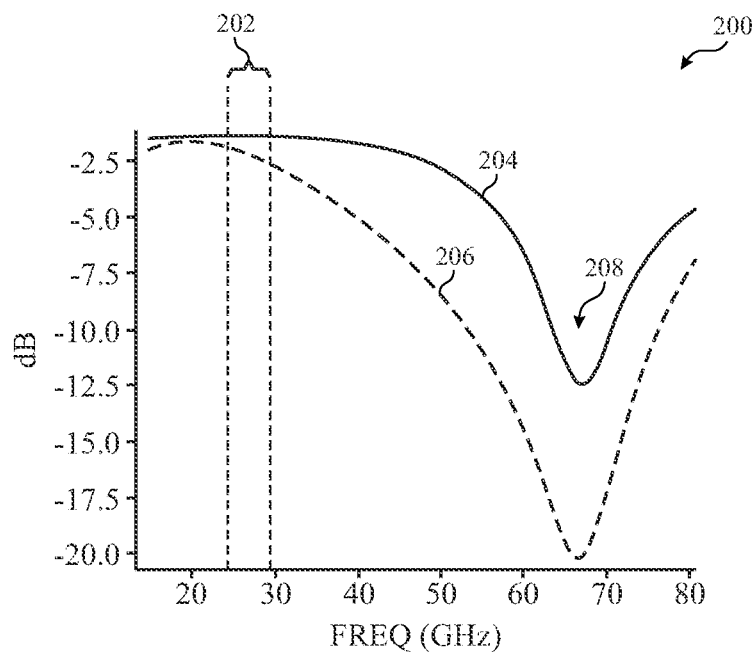
FIG. 10 is a graph of a harmonic trap or notch formed by the isolation circuitry of FIG. 7, according to embodiments of the present disclosure.

As noted above, the isolation circuitry 58 of FIG. 7 effectively reduces insertion loss while maintaining isolation of the transmitter 52 from received signals and the receiver 54 from transmit signals. FIG. 10 is a graph 200 of a harmonic trap or notch 208 formed by the isolation circuitry 58 of FIG. 7, according to embodiments of the present disclosure. The graph illustrates insertion loss (as a negative figure and in decibels (dB)) across the transmit-receive switch 118 of the isolation circuitry 58 for different frequencies of a signal across the switch 118. That is, a horizontal axis of the graph represents a frequency (e.g., gigahertz (GHz)) of the signal across the switch 118 and a vertical axis of the graph represents the insertion loss across the switch 118. The insertion loss is shown as a negative value, indicating that the loss is negative. That is, no insertion loss is illustrated at zero decibels, and an insertion loss of, for example, 1 dB, is illustrated as −1 dB.

A first (solid) line 204 illustrates an insertion loss across the switch 118 with the capacitor 124 used to generate the harmonic notch 208. A second (dashed) line 206 illustrates an insertion loss across the switch 118 without the capacitor 124. An operating frequency of the power amplifier 66 is within a range 202 between 25 GHz and 30 GHz (e.g., approximately 28 GHz, approximately 29.5 GHz, and so on). Thus, a frequency of a second harmonic generated by the power amplifier 66 may be within a range of approximately 50 GHz to 60 GHz, such as approximately 56 GHz. The notch 208 is configured to have a frequency higher than the frequency of the second harmonic, such as approximately 68 GHz. As shown, the insertion loss across the switch 118 is reduced within the range 202 of the operating frequency of the power amplifier 66.

TABLE 1

| Operating Frequency of 29.5 GHz | Without Isolation Circuitry 58 | With Isolation Circuitry 58 |
| --- | --- | --- |
| Insertion loss | 2.65 dB | 1.37 dB |
| Power consumption | 265 mW | 210 mW |
| Power added efficiency | 17% | 26.8% |

Table 1 shows the reduction of the insertion loss across the switch 118, reduction of power consumption of the isolation circuitry 58, and an increase of power added efficiency by the isolation circuitry 58, at an operation frequency of the power amplifier 66 of about 29.5 GHz. As shown in Table 1, without the isolation circuitry 58 (e.g., without the capacitor 124), insertion loss across the switch 118 at the operating frequency of 29.5 GHz may be approximately 2.65 dB. With the isolation circuitry 58 (e.g., with the capacitor 124), insertion loss across the switch 118 at 29.5 GHz may be reduced to approximately 1.37 dB. The power consumption is reduced by about 20% from 265 milliwatts (mW) without the isolation circuitry 58 to 210 mW with the isolation circuitry 58. Similarly, the power added efficiency of the isolation circuitry 58 is increased from 17% without the capacitor 124 to 26.8% with the capacitor 124.

TABLE 2

| Operating Frequency of 24.25 GHz | Without Isolation Circuitry 58 | With Isolation Circuitry 58 |
| --- | --- | --- |
| Insertion loss | 1.88 dB | 1.34 dB |
| Power consumption | 242 mW | 193 mW |
| Power added efficiency | 23% | 31.7% |

Table 2 shown the reduction of the insertion loss across the switch 118, reduction of power consumption of the isolation circuitry 58, and an increase of the power added efficiency by the isolation circuitry 58, at an operation frequency of the power amplifier 66 of about 24.5 GHz. As shown in Table 2, without the isolation circuitry 58 (e.g., without the capacitor 124), insertion loss across the switch 118 at the operating frequency of 24.5 GHz may be about 1.88 dB. With the isolation circuitry 58 (e.g., with the capacitor 124), insertion loss across the switch 118 at the operating frequency of 24.5 GHz may be reduced to about 1.34 dB. The power consumption is reduced by about 20% from 242 mW without the isolation circuitry 58 to 193 mW with the isolation circuitry 58. Similarly, the power added efficiency of the isolation circuitry is increased from 23% without the capacitor 124 to 31.7% with the capacitor 124.

Advantageously, the isolation circuitry 58 improves efficiency of the transceiver 30 while reducing interference of the transmit signal (and/or the receive signal) caused by harmonic distortion, electrostatic discharge, and/or noise signals within the transceiver 30. Further, providing a ground path to substantially remove electrostatic discharge may improve the lifespan of components of the electronic device 10, including the transmitter 52 and the receiver 54.

Figure 11:
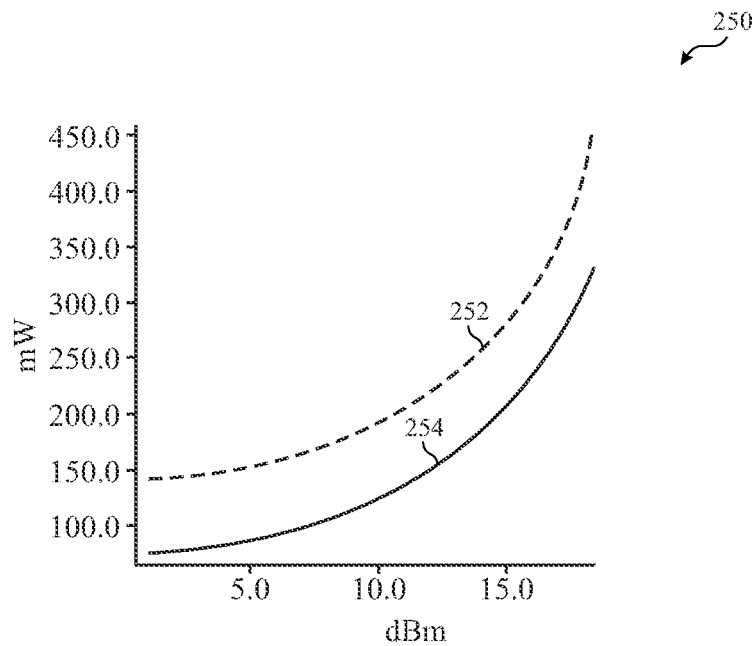
FIG. 11 is a graph illustrating an improved power efficiency of the isolation circuitry of FIG. 7, according to embodiments of the present disclosure.

FIG. 11 is a graph 250 illustrating an improved power efficiency of the isolation circuitry 58 of FIG. 7, according to embodiments of the present disclosure. A horizontal axis of the graph represents a power output of the transceiver 30 in decibel millwatts (dBm) while a vertical axis represents a power consumption (e.g., input power) of the transceiver 30 in milliwatts (mW). A first (dashed) line 252 illustrates an efficiency of the transceiver 30 without the isolation circuitry 58 discussed with respect to FIGS. 6-10. A second (solid) line 254 illustrates an efficiency of the transceiver 30 with the isolation circuitry 58.

As shown, an efficiency of the transceiver 30 is improved with the isolation circuitry 58. For example, a power consumption corresponding to the first line 252 is greater than a power consumption of the second line 254 across the output power range of the horizontal axis. That is, the input power of the vertical axis used to achieve an output along the horizontal axis is decreased by the isolation circuitry 58 when compared to an output without the isolation circuitry 58. Thus, the isolation circuitry 58 reduces a power consumption of the transceiver 30, while also reducing an occurrence of interference caused by harmonic distortion, electrostatic discharge, or other noise signals, as discussed above. Further, the isolation circuitry 58 provides a ground path to remove electrostatic discharge from the transceiver 30, which may improve the lifespan of components of the electronic device 10, including the transceiver 30.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An electronic device comprising:
one or more antennas;
transmit circuitry configured to provide one or more transmission signals for transmission via the one or more antennas, the one or more transmission signals comprising one or more harmonic distortion signals;
a ground connection; and
a harmonic rejection circuit coupling the transmit circuitry to the one or more antennas and configured to provide the one or more transmission signals to the one or more antennas, the harmonic rejection circuit comprising a first inductor and a capacitor, wherein the capacitor is coupled between ends of the first inductor and to the ground connection, the first inductor configured to provide the one or more harmonic distortion signals to the ground connection.

2. The electronic device of claim 1, wherein the first inductor is coupled in parallel to a transmission path of the harmonic rejection circuit.

3. The electronic device of claim 2, wherein the first inductor is configured to provide a low impedance to provide the one or more harmonic distortion signals to the ground connection.

4. The electronic device of claim 3, wherein the first inductor is configured to provide a high impedance to a remaining portion of the one or more transmission signals after grounding the one or more harmonic distortion signals to provide the remaining portion of the one or more transmission signals to the one or more antennas.

5. The electronic device of claim 1, comprising an electrostatic discharge filter, the electrostatic discharge filter coupled to the ground connection and configured to provide, to the ground connection, one or more electrostatic discharge signals or one or more noise signals, associated with the one or more transmission signals.

6. The electronic device of claim 5, wherein the electrostatic discharge filter comprises a second inductor configured to provide a high impedance to the one or more transmission signals and a low impedance to the one or more electrostatic discharge signals or the one or more noise signals.

7. The electronic device of claim 1, comprising a balun comprising a first coil and a second coil, wherein the first coil is coupled to the transmit circuitry and the second coil is coupled to the harmonic rejection circuit.

8. The electronic device of claim 1, wherein the capacitor is coupled to a midpoint of the first inductor.

9. A radio frequency transceiver comprising:
transmit circuitry configured to provide one or more transmission signals to one or more antennas for transmission, the one or more transmission signals comprising one or more harmonic distortion signals;
a ground connection; and
a harmonic rejection circuit coupling the transmit circuitry to the one or more antennas and configured to provide the one or more transmission signals to the one or more antennas, the harmonic rejection circuit comprising a first inductor and a capacitor, wherein the first inductor is coupled in parallel to a transmission path of the harmonic rejection circuit, and the capacitor is coupled to a winding of the first inductor and the ground connection.

10. The radio frequency transceiver of claim 9, wherein the capacitor is coupled to a first position on the winding of the first inductor to provide a first portion of the one or more transmission signals to the one or more antennas and a second portion of the one or more transmission signals comprising the one or more harmonic distortion signals to the ground connection.

11. The radio frequency transceiver of claim 10, wherein the first portion of the one or more transmission signals has a first frequency, and the second portion of the one or more transmission signals has a second frequency different from the first frequency.

12. The radio frequency transceiver of claim 9, wherein the first inductor is configured to provide a first impedance higher than an impedance of the one or more antennas to the one or more transmission signals and a low impedance lower than the impedance of the one or more antennas to the one or more harmonic distortion signals.

13. The radio frequency transceiver of claim 9, comprising an electrostatic discharge filter configured to provide, to the ground connection, one or more noise signals outside a transmission frequency range of the radio frequency transceiver or a reception frequency range of the radio frequency transceiver.

14. The radio frequency transceiver of claim 9, comprising receive circuitry configured to receive one or more receive signals by the one or more antennas, and an electrostatic discharge filter configured to provide one or more electrostatic charges to the ground connection when the receive circuitry is receiving the one or more receive signals.

15. A radio frequency isolation circuitry comprising:
a ground connection; and
a harmonic rejection circuit coupling transmit circuitry to one or more antennas and configured to provide one or more transmission signals of the transmit circuitry to the one or more antennas, the harmonic rejection circuit comprising
a first inductor, and
a capacitor coupled to the ground connection and between ends of the first inductor, the first inductor and the capacitor configured to conduct signals with a frequency of one or more harmonic distortion signals of the one or more transmission signals to provide the one or more harmonic distortion signals to the ground connection.

16. The radio frequency isolation circuitry of claim 15, wherein the first inductor is coupled in parallel to a transmission path of the harmonic rejection circuit coupling the transmit circuitry to the one or more antennas.

17. The radio frequency isolation circuitry of claim 16, wherein the first inductor is configured to provide a low impedance to conduct the one or more harmonic distortion signals to the ground connection.

18. The radio frequency isolation circuitry of claim 17, wherein the first inductor is configured to provide a high impedance to a remaining portion of the one or more transmission signals after grounding the one or more harmonic distortion signals to provide the remaining portion of the one or more transmission signals to the one or more antennas.

19. The radio frequency isolation circuitry of claim 15, wherein the first inductor is configured to provide a first impedance higher than an impedance of the one or more antennas to the one or more transmission signals and a low impedance lower than the impedance of the one or more antennas to the one or more harmonic distortion signals.

20. The radio frequency isolation circuitry of claim 15, wherein the harmonic rejection circuit comprises an electrostatic discharge filter, the electrostatic discharge filter configured to provide, to the ground connection, one or more noise signals outside a transmission frequency range of the radio frequency isolation circuitry or a reception frequency range of the radio frequency isolation circuitry.

\* \* \* \* \*